United States Patent [19]

Wernikoff et al.

[11] 3,839,675

[45] Oct. 1, 1974

[54] DELTA MODULATION COMMUNICATION SYSTEM

[75] Inventors: Robert E. Wernikoff, Boston; George Rosen, Brookline, both of Mass.

[73] Assignee: Addressograph Multigraph Corporation, Cleveland, Ohio

[22] Filed: Sept. 4, 1973

[21] Appl. No.: 394,393

Related U.S. Application Data

[63] Continuation-in-part of Ser. No. 22,753, March 26, 1970, abandoned.

[52] U.S. Cl. .............. 325/38 B, 329/104, 332/11 D

[51] Int. Cl. .............................................. H04b 1/00

[58] Field of Search......... 178/DIG. 3; 179/15.55 R, 179/15 AC, 15 AP, 15 AV, 15 AZ; 329/104; 332/11 D; 325/38 R, 38 B

[56] References Cited

UNITED STATES PATENTS

| | | | |
|---|---|---|---|
| 3,435,134 | 2/1969 | Richards | 178/DIG. 3 |
| 3,573,364 | 4/1971 | Shimamura | 325/38 B |

*Primary Examiner*—Albert J. Mayer
*Attorney, Agent, or Firm*—Russell L. Root

[57] ABSTRACT

The disclosed delta modulation communication system digitally describes small differences between successive samples of an analog signal; when a large difference occurs, the actual value of the sample, not its difference from the preceding sample, is digitally described. The system also automatically reframes incorrectly grouped code word symbols at the receiver.

16 Claims, 9 Drawing Figures

ROBERT E. WERNIKOFF
GEORGE ROSEN
*INVENTORS*

*BY* James E. Harris
*ATTORNEY*

PATENTED OCT 1 1974

3,839,675

SHEET 2 OF 8

ROBERT E. WERNIKOFF
GEORGE ROSEN
*INVENTORS*

BY James E. Hawes
*ATTORNEY*

DELTA MODULATION COMMUNICATION SYSTEM

CROSS REFERENCE TO RELATED APPLICATIONS

This application is a continuation-in-part of our prior pending application, Ser. No. 22,753, filed Mar. 26, 1970, now abandoned.

INTRODUCTION

The invention relates to an improved system for communicating an analog signal by digitally describing the difference between successive samples of the analog signal, a process known as delta modulation.

Various delta modulation systems have been proposed. An early description of a delta modulation system is presented in Cutler U.S. Pat. No. 2,605,361, issued July 29, 1952. In the simplest embodiment of this patented system, the analog signal is repetitively sampled, and the successive samples quantized. The quantized samples are transmitted, as a binary or digital message, and are also integrated then subtracted from the succeeding value of the analog signal. This results in sending to the receiver simply the quantized difference between successive samples of the analog signal. The receiver integrates these samples to reconstruct a reasonably accurate representation of the original analog signal. In other embodiments, Cutler compounds the quantizing and subtraction process by, in one case, using the difference of the difference signal, and in another case, extending this process one step further by using a triple difference signal. In all embodiments though, the final difference is described to the receiver by a binary word having a predetermined number of binary pulses, or bits, the number of bits employed to describe successive sample differences reflecting a compromise between increased fidelity of the reproduced signal and increased data to be transmitted.

Delta modulation can be used to represent any of a variety of analog signals, such as audio, video and data signals. To simplify this description somewhat, delta modulation will be discussed in terms of an analog video signal. However, the disclosed delta modulation technique can be satisfactorily applied to represent many other different types of analog signals, as will be apparent to those skilled in this art.

Extensive experimental evidence indicates that, in a delta modulation system such as described by Cutler, for acceptable digital representation of a quantized video analog signal, it is necessary to use no fewer than five bits to describe in digital, or binary fashion the original analog signal differences. For pleasing rendition of a typical analog video signal, at least six digital bits per sample should be used. Experimental evidence also has shown that while small changes in analog signal amplitude must be digitized and reproduced with great accuracy, it is not necessary to reproduce sudden large changes in signal amplitude with equal accuracy. For example, it is not necessary to accurately describe sudden changes in the brightness level of a television video signal for it is a well-known psychophysical property of the human eye that, whereas it is very sensitive to the occurrence of edges however small (so that spurious contouring in low gradient areas is noticeable and deleterious in the extreme), the eye is relatively indifferent to the precise amplitude of a change in brightness, so long as the location of the change is rendered with precision. By taking advantage of this decreasing sensitivity to increasing amplitudes of change, the quantizer can be designed with a "tapered" quantizing sensitivity to describe small changes in the analog signal with great precision but large changes only in a rather coarse fashion. This in turn allows the number of bits per sample that must be transmitted for acceptable reproduction of video to be significantly reduced, by as much as a factor of two or three. Such a "tapered" quantizer has been tested and found to produce, using three bits per sample, facsimiles that differ little in subjective quality from ordinary, linear, six bit per sample delta modulation facsimiles.

Another delta modulation technique is the coarse-fine technique suggested by some researchers at the Radio Corporation of America -- see for example "Redundancy Reduction Applied to Coarse -- Fine Encoded Video" by G. P. Richards and W. T. Bisignani, Proceedings of the IEEE, vol. 55, no. 10, October, 1967, pp. 1707–1717. Basically, the coarse-fine technique quantizes each analog brightness sample into one of 64 levels, using a six bit binary signal. So long as the first three bits of the binary signal do not change from sample to sample, the system sends the last three bits. When the first three bits do change, though, the system sends a special change signal then the new first three bit combination, and succeeding first three bit combinations until the first three bits do not change from sample to sample. The system then sends another change signal and resumes sending the last three bits of the six bit binary description of each quantized sample. To make this process somewhat clearer, the system can be thought of as dividing all possible values of the original analog signal into, say, eight coarse levels, and each coarse level into eight fine levels yielding 64 levels in all. So long as the analog signal sample remains within one of the coarse levels, the system uses a three bit digital signal to describe the fine levels of successive samples. When a sample falls within a new coarse level, the system sends the special change signal to notify the receiver of a shift to the coarse level description, then sends coarse level information until a succession of samples fall within the same coarse level, at which point the system sends another change signal and reverts to describing fine levels within the new coarse level.

Any improved delta modulation system to be worthwhile, should produce an acceptable representation of the original signal using fewer than the six bits per sample required by conventional delta modulation systems; it should faithfully and quickly describe both small and large changes between successive samples; it should be simple to implement and, if possible, it should be tolerant of errors introduced by transmission channel noise. While conventional delta modulation systems, such as described by Cutler, do meet the last three of the stated objects, they all fail to meet the first and often most important object - acceptable fidelity while using fewer than six bits per sample. Some delta modulation systems, such as the R.C.A. coarse - fine system, while using fewer than six bits per sample, are not able to adequately describe signals slowly varying about the dividing point between successive coarse levels, nor can they be implemented without extensive circuitry. Also, such delta modulation systems are quite susceptible to noise or other errors occurring in the received signal; since any error is integrated at the receiver with succeeding correct information, the distortion introduced by the error continues to propagate in the reconstructed signal. In contrast, all of the stated objects, and others as well, are satisfied by the invention, as will be clear from the following description.

BRIEF DESCRIPTION OF THE INVENTION

The invention conceives of a new delta modulation communication technique and encompasses both a system and method for repetitively sampling and quantizing an analog signal, such as the video signal of a television system. If the difference between successive samples is small, just the difference is communicated. If the difference is large, the actual value of the sample is communicated. Preferably the dividing point between small and large changes is such that large changes will occur reasonably often for the following reason: since communication processes can never be completely error free, if the system is designed so that large changes occur reasonably often, by communicating and re-establishing at the receiver the actual value of the sample heralding the large change all the preceding accumulated errors in the reconstituted analog signal will be automatically terminated. In addition to the improved delta modulation technique, the disclosed system also teaches a technique for detecting incorrect framing and automatically reframing the code word grouping of a received digital signal.

BRIEF DESCRIPTION OF THE DRAWINGS

A preferred embodiment of the improved delta modulation system will be described in connection with the accompanying drawings, in which.

DETAILED DESCRIPTION OF THE INVENTION

Figure 1:
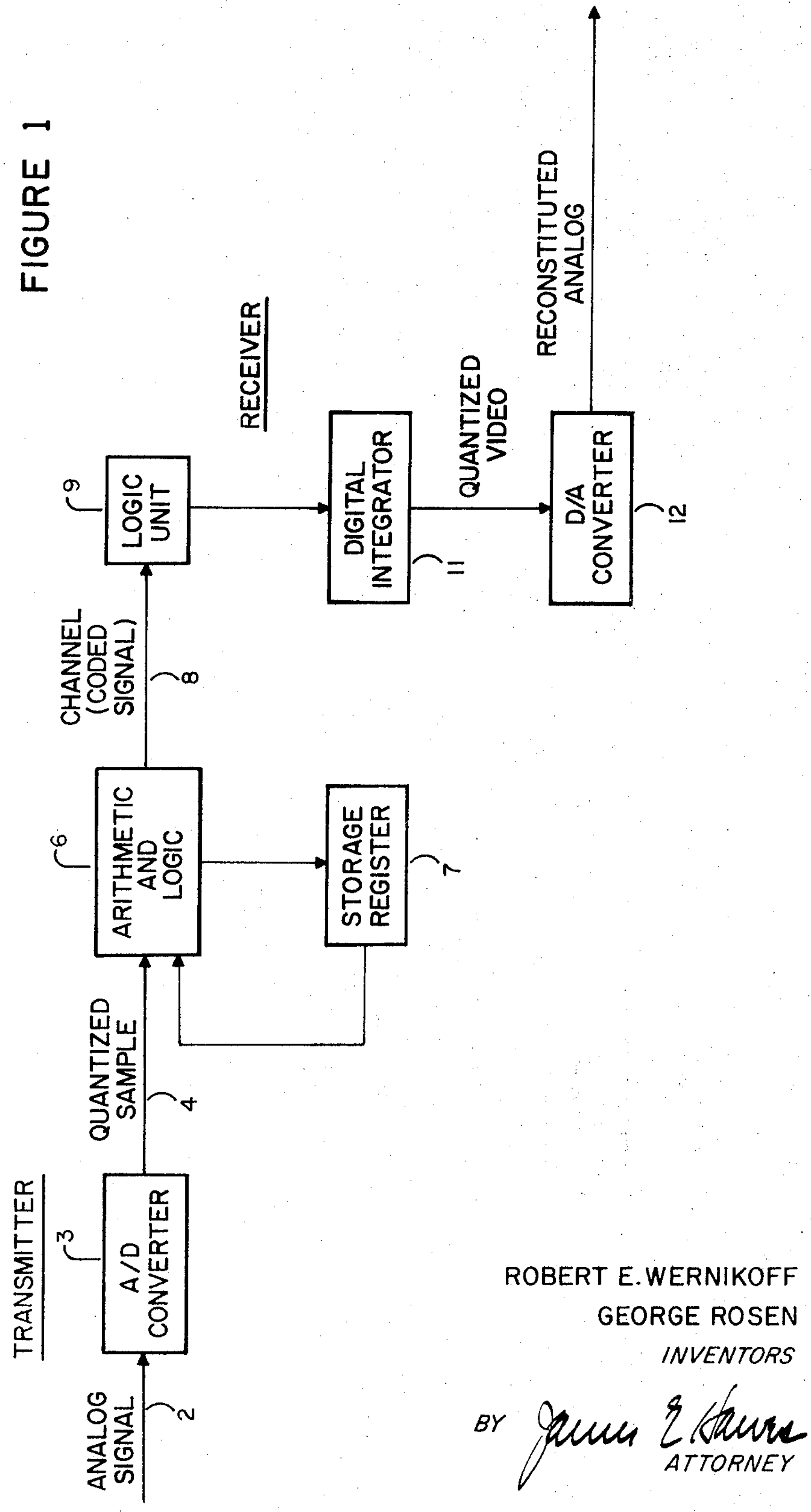
FIG. 1 is a generalized schematic representation of the various subsystems employed in the transmitter and receiver portions of the system.

The basic concept underlying the invention is simply this: that for large signal changes, the new absolute value is roughly quantized and sent; for small signal changes, each change, or difference, is accurately quantized and sent. Thus, the system accurately follows small changes; when a large change occurs, the system accurately identifies its location while approximating its amplitude value.

The process is much like using a meter with two scales or ranges. The most sensitive scale is used to measure small changes. When large changes occur, the meter is switched to the attenuated scale, or range, and, again, the full scale is used for the measurement. To advise the receiver that the transmitter has changed scales, it is merely necessary to insert in the data stream a unique word (of the same length as the data words) that flags or announces the change of scale. The scale-change instruction thus occupies the time slot corresponding to one picture sample; the very next word indicates the magnitude and sign of the sample as measured on the expanded scale. Just what is done about the picture sample whose time slot was used for the flag or scale-change instruction word will be discussed later. Since large, rapid changes in picture brightness are relatively infrequent, after a scale change is made and the value of the sample recorded, the system automatically reverts to the scale corresponding to small changes without further instruction.

Thus the sequence of events is as follows:

a. The quantizer normally is in the state appropriate to the measurement of small differences. Suppose, for example, that the sampling rate is such that, when the successive samples are quantized into six-bit words, using three-bit words to describe both "small" differences and the absolute value of "large" changes results in a relatively good reconstruction of the "original" analog signal. Accordingly, three-bit code words will be used to describe the successive samples. Of course, other code word lengths could be used if desired, and may in fact be preferable if the noted assumptions are not true for the particular analog signal being coded. Nevertheless, when describing "small" changes, of the eight three-bit code words available, seven are used to represent measurements and one is used to represent the scale-switch instruction.

b. Suppose that a sample arrives that represents a large step change in brightness. If the size of the change exceeds the dynamic range of the fine quantizer, that fact is detected and the reserved scale-switch instruction word is sent over the channel. At the same time, the quantizer input is switched from the difference-sequence line to the actual sample value line, and now the whole range of the quantizer (i.e., all its levels) is used to measure the absolute value of the sample. The quantized value of the sample, not the change, is transmitted and correctly interpreted by the transmitter and receiver integrators; the quantizer is switched back to the difference-sequence line in time for the next sample, and the system reverts to quantizing and transmitting changes from then on. Thus, whenever a large change occurs, both the transmitter and receiver integrators are reset to the absolute, rather than the relative, value of the analog signal. Furthermore, all levels of the quantizer are used to make the rough measurement, so that the quantization error can never exceed the dynamic range of the fine quantizer. Then, on the next and succeeding samples, the system reverts to measuring accurately small changes from that new absolute value.

Conventional delta modulation systems are extremely vulnerable to noise because of the integrator: once an error is made, the error becomes a part of the running total produced by the integrator. In the case of a digital integrator, the error will persist forever (i.e., until the integrator is reset); in the case of an analog integrator, the error will propagate for more or less time according to the decay time constant of the integrator (i.e., its rate of forgetting). It would seem at first sight that a good way to make the delta modulation system less sensitive to the errors which are bound to occur is to use a "leaky" integrator -- i.e., one with a short time constant, so that it forgets quickly. But since this "forgetting" will also increase the difference between succeeding samples, more changes will have to be rough-quantized, which tends to produce spurious contours in the facsimile.

In the improved delta modulation system, which will now be described, errors will not propagate very far because when a large change occurs, the value that is quantized is the actual value of the analog signal sample, rather than difference between it and the previous sample. Thus, the system begins afresh each time a large change occurs, and no previous error can propagate beyond this point.

One general arrangement of subsystems which may be used to realize the advantages of the improved delta modulation communication technique of the present invention is schematically shown in FIG. 1. Briefly, the analog signal to be communicated is applied over a line 2, an electrical conductor, to an analog to digital (A/D) converter 3. The A/D converter, a conventional device, periodically samples the value of the analog signal, and converts the sample into a quantized, digital value -- e.g. a six bit binary word. This quantized sample is applied, over a line 4, to an arithmetic and logic unit 6. In this unit, the quantized value of the previous sample, held in a storage register 7, is subtracted from the current quantized sample. Subsequent to the subtraction, logical operations determine the mode of transmission and form the actual word which is to be transmitted for this sample time. While the coded signal is being transmitted over a communication channel 8, the quantized value held in the storage register, which corresponds to the immediately previous sample value, is changed to correspond to the quantized value which the receiver will contain if there is no error in reception, thus providing a quantized value to compute the next difference. Succeeding calculations proceed in like fashion. The successive received coded signals are monitored by a logic unit 9 to keep track of the range they represent -- whether a large absolute value or small difference signal is being conveyed -- then applied to a digital integrator 11. Depending on the range represented by the coded signals, the digital integrator either sums the current binary signal with previous signals or establishes a new binary value if an absolute value is conveyed. The resultant binary signal is applied to conventional digital to analog (D/A) converter 12 whose output analog signal is a reconstituted version of the original analog signal.

Figure 2:
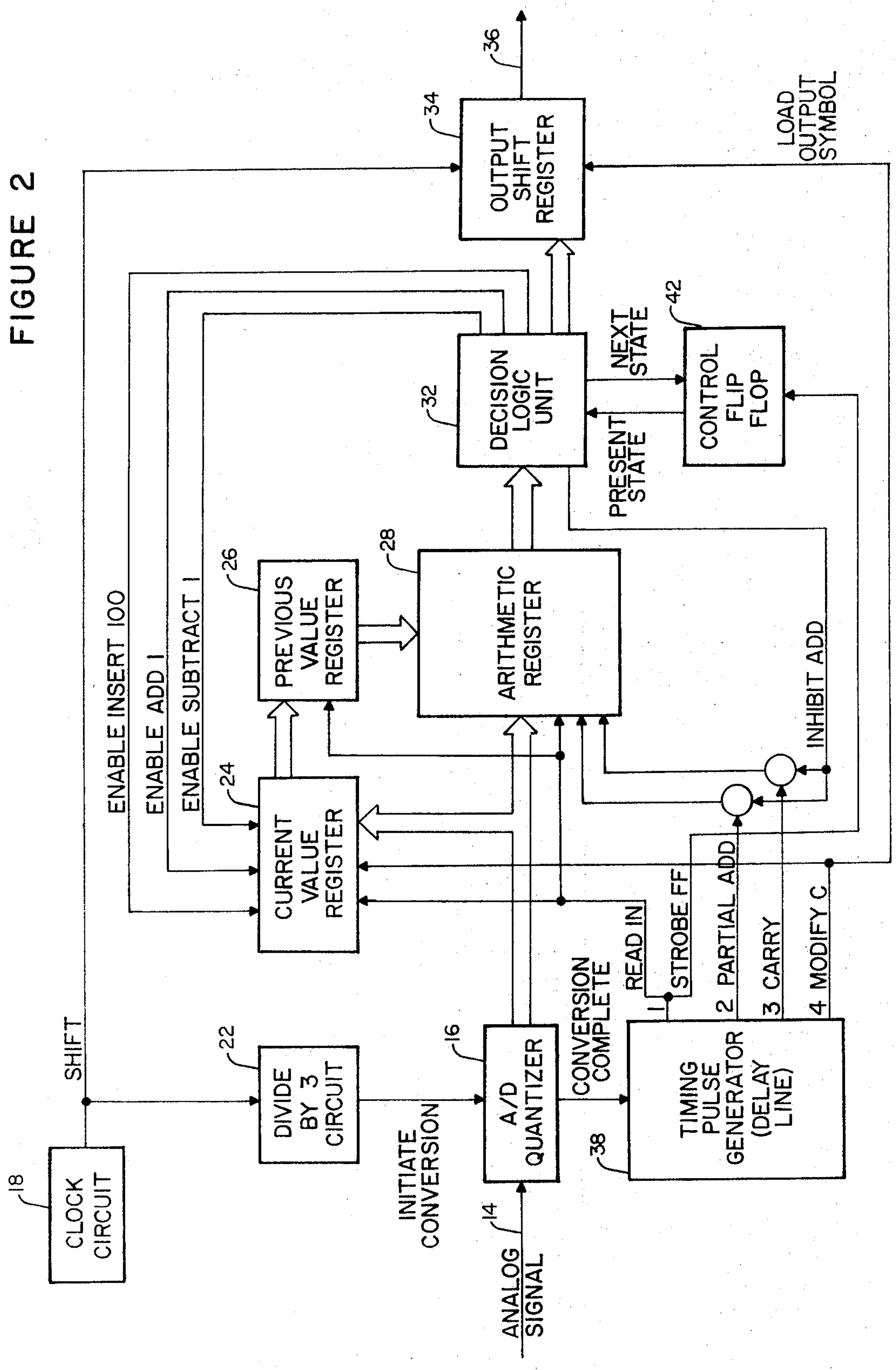
FIG. 2 is a schematic representation of the preferred transmitter system.

FIG. 2 schematically presents a preferred embodiment of the transmitter for coding a typical analog signal, such as a television video signal. The analog video signal is applied over a line 14 to an A/D Quantizer 16, such as an Epsco Videoverter TWV-744 or a Raytheon AD-50A video quantizer, which at each sample time, signalled by every third clock pulse from a clock circuit 18, each third pulse producing an output from a divide-by-three circuit 22, quantizer the video signal into a 64 level, six bit binary signal. The quantized video signals are then applied to digital circuits which perform arithmetic and logical operations to produce a coded video output. More specifically, the binary number from the A/D Quantizer 16 is supplied to, and stored in, a current value register 24. One sample time later this binary number is supplied to a previous value register 26. The previous quantized sample value is subtracted in an arithmetic register 28 from the current quantized sample value of the A/D Quantizer 16. A decision logic unit 32 uses the resultant binary number in the arithmetic register 28, which is the difference between the current and previous quantized video values, to decide, in a manner which will be described presently, which three-bit code word is send to an output shift register 34 for transmission over a communication channel 36 at times marked by the clock signals. Having made this decision, the logic unit also modifies, if necessary, the contents of the current value register so that the binary number it holds is the binary number held in the digital integrator in the receiver after the transmitted code word is assimilated by the receiver. The process of comparison and modification constitutes a digital feedback loop.

The interval between sampling pulses of the quantizer is divided into four parts by means of a delay line timing pulse generator 38. The contents of the A/D Quantizer 16 are read into the registers 24 and 28 under control of the first timing pulse. The first timing pulse, before loading the current value register, first transfers the old contents of the current value register into the previous value register 26 so that the current value of the previous sample time becomes the previous value of the current sample time. The complement (negative) of the contents of the previous value register 26 is added to the contents of the arithmetic register 28 at times signalled by the next two timing pulses. One pulse is required for a "partial add" operation, the other for carry. Thus, after this operation, the arithmetic register will hold a binary number representing the difference between the current sample value and the modified previous sample value. Preferably, the arithmetic register 28 functions as a seven-bit signed accumulator operating in the twos complement system using an end-around carry to derive the twos complement number from the ones complement number supplied by the previous value register 26.

Associated with the decision logic unit 32 is a control flip-flop 42. If the word just supplied to the output shift register was an instruction word, the control flip-flop is set, by the first timing pulse, to a one state; otherwise it is in the zero state. The decision logic unit 32 responds to the results of the difference comparison held in the arithmetic register, and to the state of a control flip-flop 42, to determine which code word to send next, and modifies the contents of the current value register 24 accordingly. Both of these actions occur as a result of the fourth timing pulse from generator 38. The conditions examined and the actions taken by the decision logic unit are summarized in the following table:

| CONDITIONS | | | | ACTIONS | | |
|---|---|---|---|---|---|---|
| Table Row | Contents of 28 | State of 42 | Symbol Sent | Modification of Current Value Register | Timing Pulse Exceptions | Next State of 42 |
| 1 | A<4 | 0 | Fine (A) | None | None | 0 |
| 2 | A>4 | 0 | Instruction | None | None | 1 |
| 3 | All cases | 1 | Coarse | Insert 100 | Inhibit | 0 |
| 4 | A=+4 | 0 | Fine (+3) | Subtract 1 | None | 0 |
| 5 | A=−4 | 0 | Fine (−3) | Add 1 | None | 0 |

(A = Digital difference between current and previous quantized sample values)

Row 1

If the grey level difference between two successive samples is three steps or less, then one fine-scale, or fine, code word (−3, −2, −1, 0, 1, 2, 3) will make an exact correction to the contents of the receiver's digital integrator. Thus, one fine code word -- the three least significant bits held in the Arithmetic Register 28 -- is supplied to the output shift register for transmission and the current value register is not modified, reflecting the exactness of the fine code word.

Rows 2 and 3

If the grey level difference is greater than 4 (row 2), it is necessary to change the scale of the transmission word. To accomplish this, he decision logic transfers a predetermined code symbol sequence, namely 100, to the output shift register. This sequence is an instruction code word which tells the receiver to change the scale with which it interprets the next three-bit code word. The transmitter is then committed to send a coarse-scale, or coarse, code word during the next sample time. Because the value of the next sample may be quite different than the value of the sample which triggered the coarse-scale change, and indeed may even be within a few grey scale steps of the value of the sample which preceded the triggering sample, to be sure of capturing and conveying the triggering sample value it is preferable to inhibit all quantized sample read-in operations during sampling time following a coarse-scale triggering sample, and to both retain the triggering sample in the Current Value Register 24 and to transfer it unchanged through the Previous Value Register 26, to the Arithmetic Register 28. However, since this mode of operation would appreciably increase the complexity of the circuit, a simpler although sub-optimal mode of operation will be employed in the disclosed system. During the next sample time the system will continue to operate as before, entering the quantized-value of the next sample in the Current Value Register 24 and the Arithmetic Register 28 after transferring the coarse-scale triggering sample value to the Previous Value Register 26 in response to timing pulse 1. However, as indicated by row 3 of the table, since the control flip-flop 42 is in the "one" state, it will inhibit the add and carry operations normally actuated by timing pulses 2 and 3. Thus, during the sample time following the triggering sample, the content of the Arithmetic Register 28 will remain the quantized value of the sample, rather than being changed to the difference between it and the previous value. This is an important feature of the system, for reasons previously described. The decision logic then transfers the three most significant bits (the $2^5$, $2^4$, and $2^3$ value bits) of the quantized sample in the arithmetic register to the output shift register 34 for transmission as a coarse code word. The receiver, having previously received an instruction code word, interprets this code word as a six bit number whose first three bits equal the coarse code word and whose last three bits are understood to be 100 (binary four). This convention of binary four is chosen so that positive and negative increments may later be taken about the midpoint of the coarse interval which has eight fine levels. To reflect the receiver's response in the transmitter, the contents of the current value register 24 are changed as a result of a signal supplied by the decision logic unit, by inserting 100 in bit positions $2^2$, $2^1$, and $2^0$ while leaving the others intact. Thus, a fresh start has been made. The transmitter and receiver have been reset with absolute values rather than with differences. All previous history, including errors, has been forgotten.

Rows 4 and 5

Because of the instruction code word, and because one fine code word is used to represent no change from the previous sample, the remaining fine code words can describe six levels of change while in the disclosed system each fine interval has eight levels. Therefore, two fine levels per interval remain which can be reached only by sending two fine words after sending a coarse word. The two levels represent changes of +4 and −4. Should such a change occur, the largest possible fine correction, +3 or −3, is sent. The number 1 is then added to, or subtracted from, the contents of the current value register by a signal supplied by the decision logic unit to reflect the discrepancy of one grey level which occurs at the decoder in the reconstituted version of the original analog signal at this sample time.

The operation of the transmitter for an illustrative analog signal input is shown in the following table. Successive rows of the table represent successive quantization intervals.

| Input Signal Level | Internal Comparison Level | Arithmetic Register Difference | Control Flip-Flop State | Kind Of Word Sent | Number Sent Decimal | Number Sent Binary |
|---|---|---|---|---|---|---|
| 46 | 46 | | Fine | 0 | 000 | |
| 47 | 46 | 1 | 0 | Fine | 1 | 001 |
| 18 | 47 | −29 | 0 | Inst. | Inst. | 100 |
| 18 | 18 | Inhibited | 1 | Coarse | 2(X8) | 010 |
| 18 | 20 | −2 | 0 | Fine | −2 | 110 |
| 18 | 18 | 0 | 0 | Fine | 0 | 000 |
| 56 | 18 | +38 | 0 | Inst. | Inst. | 100 |
| 56 | 56 | Inhibited | 1 | Coarse | 7(X8) | 111 |
| 56 | 60 | −4 | 0 | Fine | −3 | 101 |
| 56 | 57 | −1 | 0 | Fine | −1 | 111 |
| 56 | 56 | 0 | 0 | Fine | 0 | 000 |

While any assignment could have been used, in the above example the fine-scale code word vocabulary was assigned as follows, the negative value words complementing the positive value words:

| | | | |
|---|---|---|---|
| No change | 000 | Instruction word | 100 |
| change of +1 | 001 | change of −1 | 111 |
| change of +2 | 010 | change of −2 | 110 |
| change of +3 | 011 | change of −3 | 101 |

Figure 3:
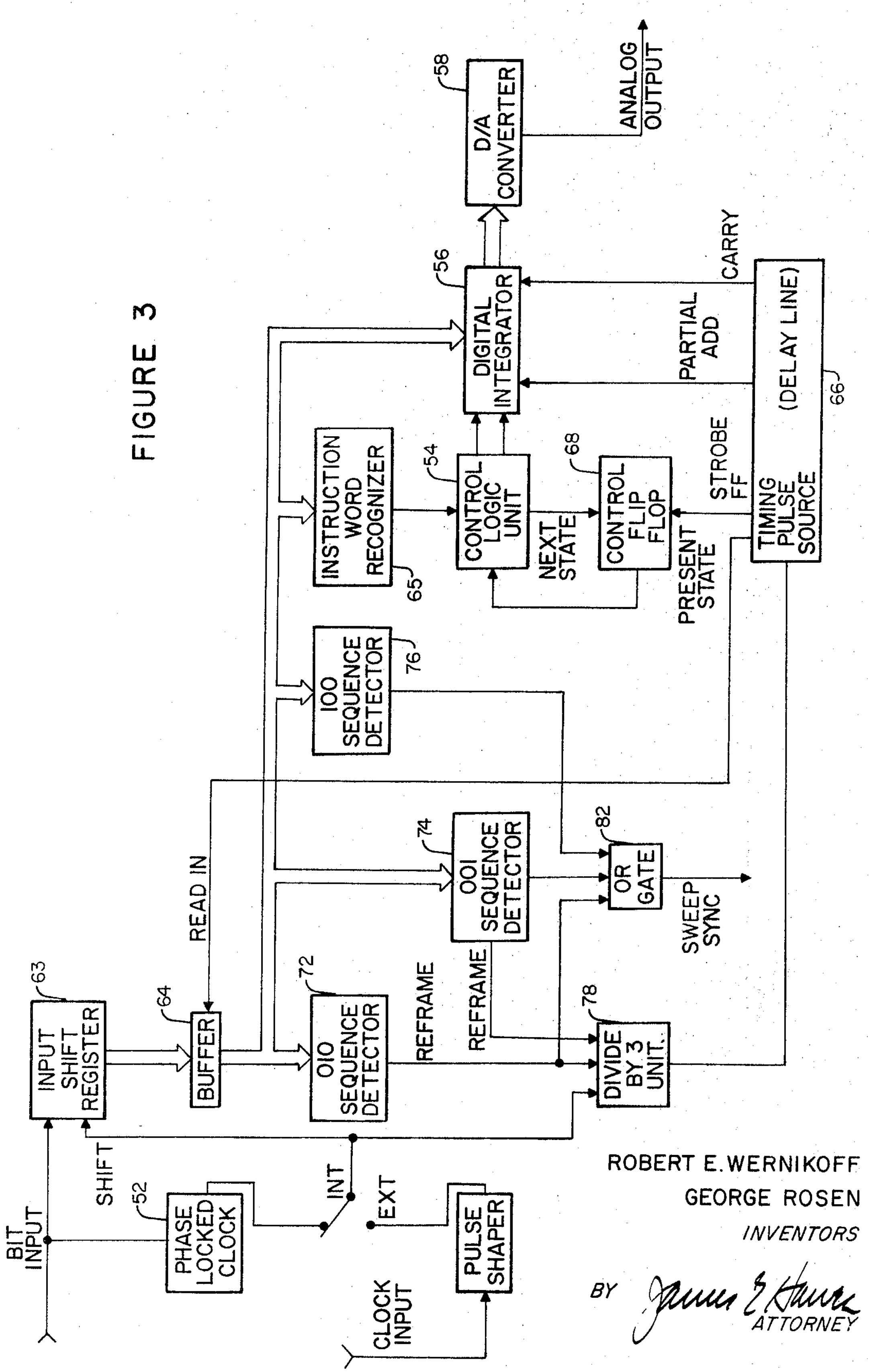
FIG. 3 is a schematic representation of the preferred receiver system.

FIG. 3 schematically presents a preferred embodiment of the receiver for reconstituting an analog signal accurately representative of the video signal coded and communicated by the transmitter. The FIG. 3 receiver includes logic 9 of FIG. 1 corresponding to all FIG. 3 components except the integrator 56 and converter 58 which correspond to the elements 11 and 12, respectively, in FIG. 1.

The primary functions of the receiver are to detect the incoming binary bit stream, to properly frame and decode successive three bit code words, and to produce analog voltages corresponding to the coded transmission. This is accomplished by logical as well as analog means; the principal components of the receiver are a clock 52, a control logic unit 54, a digital integrator 56, and a D/A converter 58. The actions and functions of the clock and of the various synchronizing circuits will be described after first generally reviewing the operation of the receiver to show logical information flow and application.

Assuming that the receiver has been properly synchronized by conventional means and is in proper word sync with the clock operating at the proper rate, successive transmitted code words shifted from an input shift register 63 to a buffer 64 are examined by an instruction word recognizer 65 which, upon detecting the instruction word bit sequence, notifies the control logic unit 54 of the occurrence of an instruction word denoting a change to the coarse scale. So long as the word sequence consists solely of fine-scale words, the control logic supplies a signal to cause each input code word to be digitally integrated (added) to the previous value which was in the digital integrator 56. All these operations occur in response to specific timing pulses (as in the transmitter logic) generated by a timing pulse source 66 which derives its input from the clock 52 and from synchronizing circuits which will be described later. Synchronously with the addition performed by the digital integrator, the D/A converter 58 changes value to produce the output analog waveform.

When an instruction word occurs in the sequence of received code words and is recognized by the instruction word recognizer 65, the integrating function is inhibited by the control logic unit causing the D/A converter to retain the preceding value, and a control flip-flop 68 is set to the one state. This control flip-flop now serves to control the action of the control logic until the following operations are completed (similar to the action in the transmitter). At the next code word time, the three-bit coarse-scale word is jam-transferred into the most significant three bits of the digital integrator and the word 100 is jam-transferred into the least significant three bits of the digital integrator by the control logic unit, resulting in a corresponding change of the D/A converter output. Thus, the reconstituted analog signal changes to the new value as specified by the coarse-scale code word. The fine-scale operation of the receiver then resumes as described with the integration of succeeding fine-scale code words taking place until the occurrence of the next instruction word.

Just what the receiver should print out for the time slot occupied by the scale-switch word is somewhat arbitrary. If the reconstituted analog video waveform is being displayed line by line using a digitally deflected scanning system, the problem does not arise: the counting that generates the horizontal scan is simply interrupted both at the scanner and at the receiver for a time equal to the transmission time of the scale-switch word. Thus, the frame duration changes somewhat from frame to frame, in accordance with how many large changes the picture contains, but there is no loss of information and no arbitrariness. Each picture element is printed out with the brightness value determined by the scanner. The same effect can be obtained in an analog-deflected system; the decision that sends scale-switch word over the channel can trigger a circuit in the sweep generator that retards the sweep ramp by one picture-element time, by adding a step of voltage corresponding to one element width. The corresponding action is performed at the receiver when arrival of the switch word is detected. To operate in this manner, however, the normal video line sync and frame sync pulses can no longer be generated by periodic sources, since both line and frame time are now functions of the number of large changes in the picture. Both line and frame sync pulses would have to be generated by detecting when the respective ramps cross a threshold level that determines end-of-line and end-of-frame.

If it is mandatory that line and frame sync be strictly periodic, and not vary according to the number of large changes encountered in the picture, then an arbitrary analog value will have to be assigned to the interval occupied by the scale-switch word. For example, the value of the element preceding the switch word could simply be repeated. Or, alternatively, the element corresponding to the switch word could always be printed black. This would put a barely visible black outline around all objects in the picture and thus create in the viewer a suggestion of crispness that many find very agreeable to the eye.

Variable line and frame times are usually acceptable in facsimile and non-real time video applications of the disclosed technique, whereas the constant line-and frame-time method may be preferred for real-time television transmission. It is clear, however, that either of the conventions described above may be used in either application. In application of the improved delta modulation technique to speech digitization and compression (in which application the term grey level, as used here, is to be interpreted as describing audio amplitude or intensity), there is no equivalent of line or of frame time, but the rate of sound production at the receiver is nevertheless fixed by the real-time nature of the process, which demands a sample value for each sample time. In speech applications, therefore, only the second of the two methods listed above is possible, and the time slot occupied by the instruction word must be arbitrarily filled, either by setting it to zero (which, in audio applications, may result in an undesirable "click" sound), or by interpolating between the previous and the next sample value (which results in undesirable low-pass filtering of large transitions), or by setting it equal to the previous value, which choice is unnoticeable and therefore perhaps is most desirable. The second method listed above is probably also indicated in applications of the improved delta-modulation technique to telemetry of scientific data. Here again there is no fixed line-or frame-time, but it may be undesirable to distort the time scale of the physical data, as would happen if the first method were used. It is to be noted in this connection that the distortion of the time scale is cumulative and could become quite large in the course of a long measurement sequence. As to the treatment of the sample values corresponding to the time-slot occupied by the instruction word, it will usually be best in a physical experiment either to omit the point or reproduce it as a clearly distinguishable symbol or mark to avoid confusing it with, and thus partly falsifying, legitimate physical data.

It is necessary to provide receiver synchronization at three levels - 1) to ensure that the receiver clock is running at the same frequency as the transmitter clock (clock sync); 2) to ensure that the bit stream is interpreted as adjacent three bit words in the one correct way out of three possible ways (bit framing); and 3) to provide necessary horizontal and vertical sweep synchronization (sweep sync), should the original analog waveform represent a scanned frame.

The disclosed system has two clock modes, external and internal. In the external mode, a sinusoidal oscillator (100 KHz to 30 MHz) may be connected to test either or both of the transmitter and receiver systems. Shaping circuits generate clock pulses from the sinusoid to keep the transmitter and receiver exactly synchronized. In the internal mode, the receiver receives pulses over the communication channel which are synchronized with the transmitter clock, which pulses are used to phaselock the receiver's clock 52. To operate in this mode, preferably the transmitter and receiver clocks are tuned to approximately the same frequency and a phase-lock servo loop adjusts the receiver clock frequency to equal exactly the transmitter clock frequency, as is conventional.

Bit framing is provided by sending a unique pattern at appropriate intervals during the analog signal, such as at the beginning of each video scan line, and by introducing a constraint among groups of code words so that misframed bit groups cannot be confused with the unique pattern whether framed correctly or not. Assume, for example, that the instruction word is chosen to be 100, and that the sync pattern is chosen to be a multiple sequence of such words, for example 100100100100100 (five instruction words), and that the transmitter decision logic is constrained by an appropriate counting unit (not shown) so that the code words 010 and 001 cannot occur consecutively three times. If the input signal results in either consecutive sequence, then the transmitter's decision logic will automatically substitute 000 for the third code word. Thus, the only way of getting more than three ones each separated by double zeros is to transmit the sync pattern. This statement holds for all three ways of grouping the bits into code words. It is not necessary to consider what code words may precede or follow the sync pattern because spurious five word patterns will be broken in the middle (at the third word). The effect on the reproduced video picture of this feature of the transmitter's decision logic is small. The second code word of the multiple 010 or 100 sequence is not an instruction word, and therefore the third code word will be a fine-scale correction -- one grey level in one case, two in the other according to the postulated code vocabulary. The effect of changing the third word in the sequence to 000 is to delay this small correction for one picture element. The probability of this occurring is small because it is applicable to only 2 out of $7^3$ patterns, assuming that all corrections are fine.

The framing system is implemented by two reframing sequence detectors 72 and 74, and one correct framing sequence detector 76, and all are connected to the receiver shift register buffer 64. Each detector consists of an "and" gate connected to an internal counter. One reframing gate recognizes 001; the other recognizes 010. As a result of the outputs of these reframing detectors, four consecutive occurrences of one pattern will advance the divide by three unit by one bit, four occurrences of the other will retard it. Any time a gate fails to detect its three bit pattern, the corresponding internal counter is reset to enforce the condition of detecting consecutive occurrences. The third sequence detector 76 produces an output when the bits are properly framed.

If a video signal is being communicated, the three detector outputs may be fed to an "Or" gate 82 to generate horizontal sync pulses for the receiver's associated video system. When composite video having sync pulse intervals is fed to the transmitter, a sync pattern may be automatically supplied to the output shift register 34 and sent during the sync pulse interval. In the case of a noncomposite video signal of a type having no sync interval, five picture elements may be appropriated for the sync pattern. Should the video signal include sync, as does a television signal for example, circuits can be added to the transmitter for switching to a mode which uses the sync information from the video signal to put the framing pattern (five or more consecutive three bit instruction words) into the bit stream of noncomposite video. Vertical sync may be sent as a unique pattern of long duration composed of intervals of various lengths in which the horizontal sync or framing pattern is alternately present and absent. Thus the waveform at the output of the "Or" gate 82 in the receiver will reproduce the waveform of the sync source fed to the transmitter. This waveform signals occurrence in the transmitted coded signal of all the horizontal sync pulses as well as the vertical sync and equalizing pulses. It can be used by standard television circuits for synchronization and deflection.

Certain quite important advantages are realized by the improved delta modulation technique. It is not appreciably degraded by transmission or other noise present in the received signal. For example, normal television pictures exhibit, on the average, some 50 edges (large changes) per scan line. Since each occurrence of an edge results in a resetting of the integrator, the latter will be reset every ten or fifteen picture elements. Thus, by employing the disclosed coding technique the effect of a channel error will not propagate more than that distance, save for the infrequent times when the error affects the scale-switch word itself, in which the case error will persist until the next scale-switch word -- i.e., it will persist for 20 or 30 elements, on the average. This is very different from conventional delta modulation techniques, in which a single error will affect the remainder of the whole scan line, and in which successive errors are cumulative.

The transient behavior, and resulting picture quality, is another important advantage realized by the improved delta modulation technique. In fact, when used to communicate television video information the quality of the resulting picture will not differ much from an ordinary six-bit pulse code modulation transmission because the result of scale-switching is, in effect, to build-in the fine scale into each rough-scale level. Since with a three-bit transmission using the disclosed system there are eight rough levels and six fine ones, there are at least 48 divisions in the total dynamic range which can be described by two three-bit words; all 64 divisions of the six-bit quantization can be covered by three three-bit code words. Accordingly, after a larger change occurs, the reconstituted video will at worst approximate the original value to within 6 percent of full scale on the first step, 1.6 percent of full scale on the second step, and 0.8 percent of full scale on the third. In most cases, the reconstituted video signal will attain the value of the original signal to within 6 percent of full scale one picture element after a large change occurs, and attains the value of the original signal to within 0.8 percent of full scale on the next picture element, approximating the original video signal to that tolerance thereafter. This response rate is much better than the response rate for any of the conventional delta modulation techniques. In addition, the improved delta modulation technique of the invention is free of large-amplitude oscillations following a sudden large change in the original analog signal, and this too is an extremely important determinant of picture quality because, although overshoots are tolerable (indeed, even pleasing, because of the eye's predilection for contrast) the large oscillations produce a multiplicity of edges displaced from each other. The resultant pattern of spurious contours is readily noticeable; the multiplicity of edges look like ghosts in a television picture, and is most annoying.

It is useful to note that even if the disclosed system transmitted only two bits per sample (as opposed to the six bits of ordinary PCM), it would provide sixteen levels of measurement. Thus, the improved delta modulation technique, even if using only two bits per sample, will produce better pictures than conventional delta modulation systems using three bits per sample (i.e., eight levels).

While it is deemed that the above description of an exemplary system for accomplishing the present invention is sufficiently detailed to enable one skilled in the art to make and practice the invention in its best mode, FIGS. 4–9 are presented to show exemplary details for implementing several of the block elements described above with respect to FIGS. 1–3.

Figure 4:
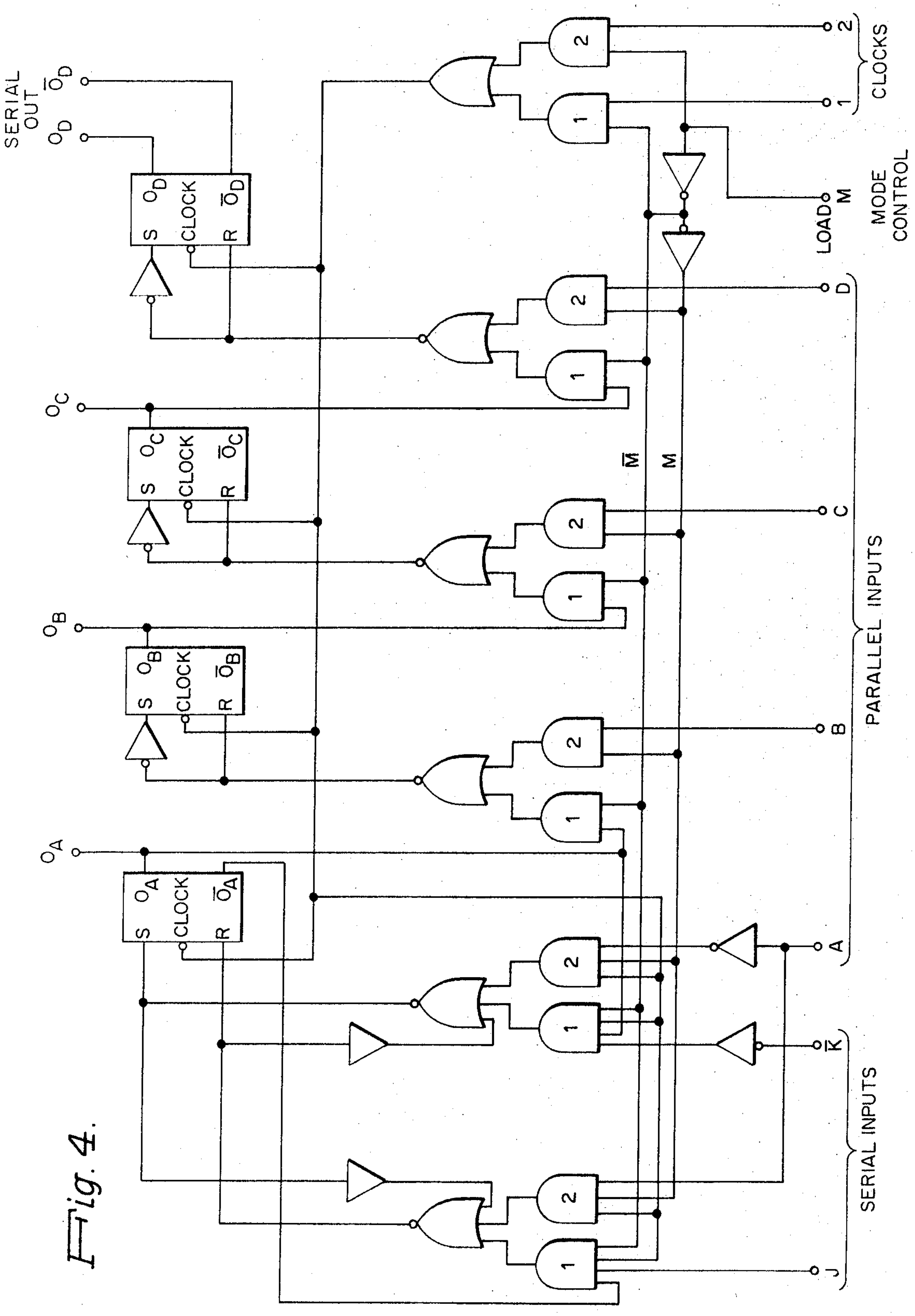
FIG. 4 is a detailed implementation of a prior art shift register of a type which may be used in the invention.

In particular, the shift registers 26 and 34 in FIG. 2, and 63 in FIG. 3, may typically be implemented by a type of shift register exemplified by the model SN 54L99 of the Texas Instruments Company which is diagrammed in FIG. 4. For example, the register 26 would employ the parallel inputs A–D and parallel outputs $0_A$–$0_D$. The read-in command from generator 38 to register 26 could be applied to the load control. The output shift register 34 has a parallel input which could typically employ inputs A–D and serial outputs $0_D$ or $\bar{0}_D$. The shift control input to register 34 could be applied to either clock inputs and the LOAD control applied to the LOAD input. The shift register 63 would employ the serial inputs J or $\bar{K}$ and the parallel outputs $0_A$–$0_D$ with the SHIFT control applied to either clock inputs.

Figure 5:
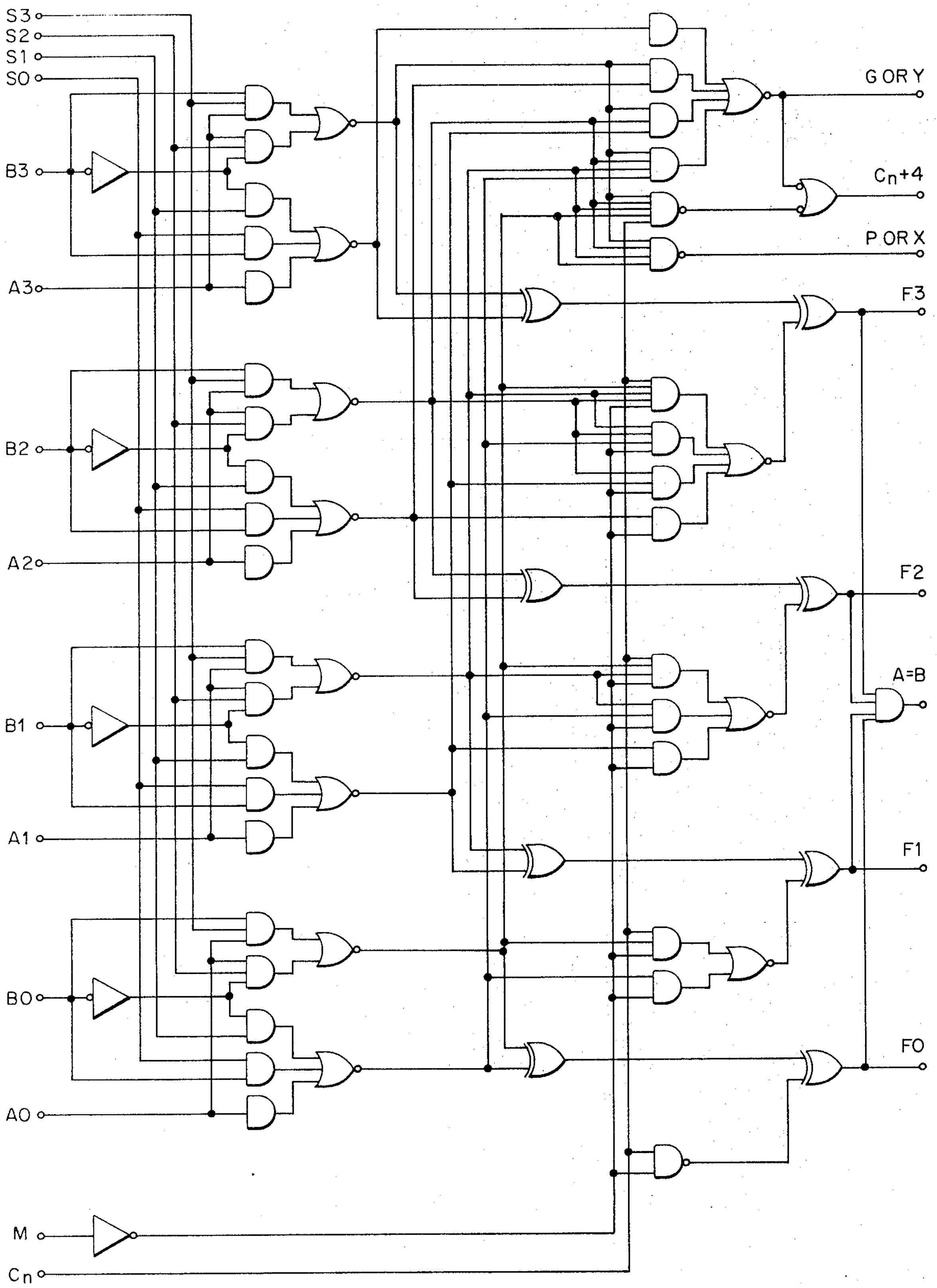
FIG. 5 is a detailed implementation of a prior art arithmetic register of a type which may be used in the invention.

An arithmetic logic unit is shown in FIG. 5 for arithmetic register 28 as well as the digital integrator 56. The FIG. 5 diagram corresponds to the type SN 74181 Arithmetic Logic Unit of the Texas Instruments Company. In this application, the two parallel inputs to the register 28 are applied to the parallel inputs labelled by the A0–A3 and B0–B3 designations of FIG. 5. The parallel output is taken from the terminals designated F0–F3. The three inputs to the arithmetic register 28 respectively from the generator 38 in FIG. 2, and the two summing circuits, are applied to the S0–S3 inputs in accordance with the manufacturer's specifications. For implementing the digital integrator 56 with the FIG. 5 diagram, the above-specified parallel inputs and outputs may be employed with the JAM and INTEGRATE controls from the control logic unit 54 applied to the S0-S3 controls in accordance with the manufacturer's specifications for the indicated function while the partial add and carry lines from the delay line 66 are applied to the TIMING and MODE controls.

Figure 6:
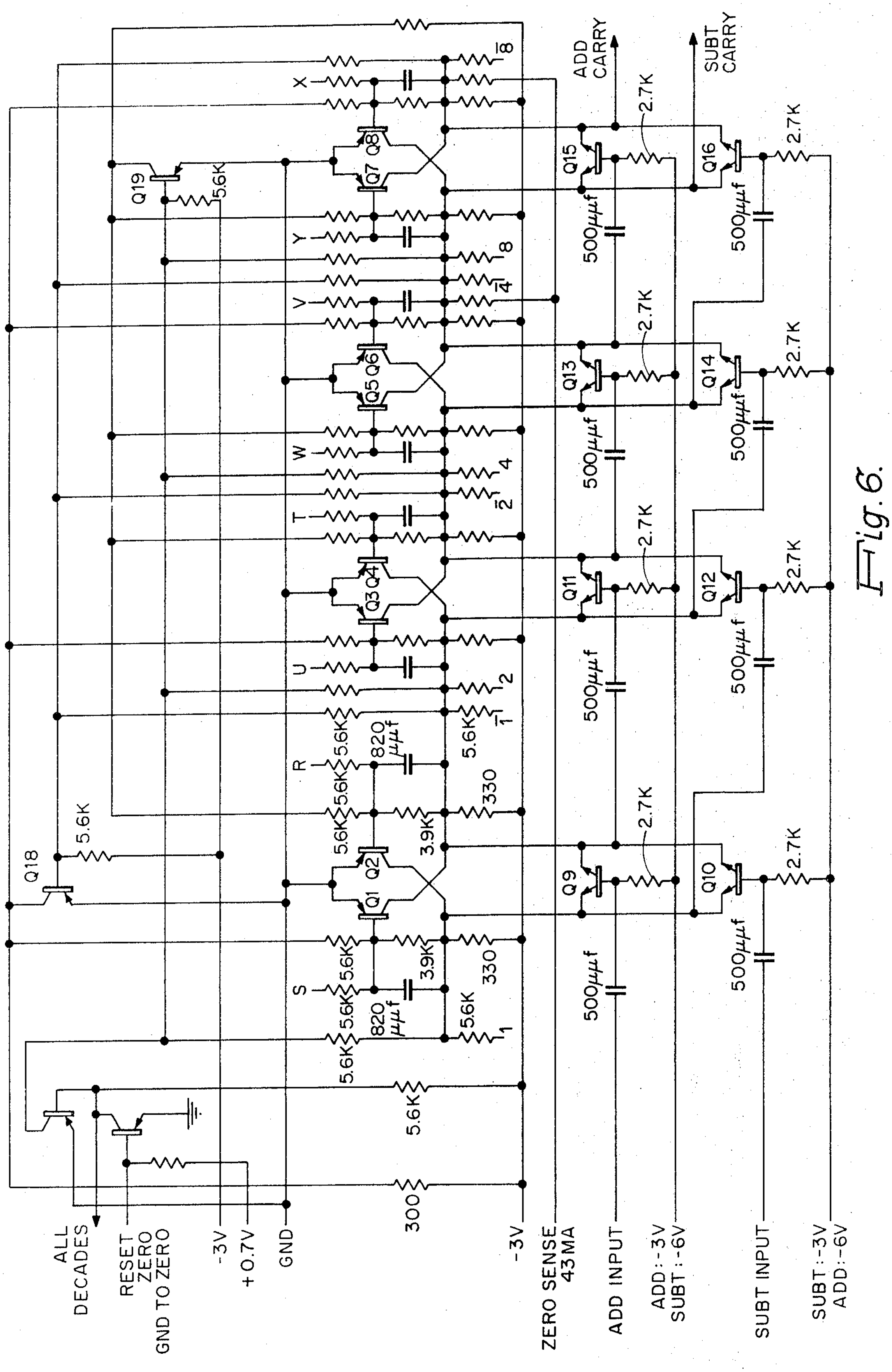
FIG. 6 is a detailed implementation of a prior art counter of a type which may be used in the invention.

The current value register 24 may typically be implemented by an up/down counter of the type illustrated in FIG. 6, which was described at pp. 86–88 of "Electronics" magazine, volume 33, number 1. The register of FIG. 6 has parallel inputs and parallel outputs corresponding to those inputs of the register 24 and labelled in FIG. 6 as S, U, W, Y and 1, 2, 4 and 8. The two inputs to register 24 on lines labelled READ IN and MODIFY C from the generator 38 of FIG. 2, typically correspond to sample interval controls and could be applied to operate the ADD, SUBT and the parallel inputs. The inputs labelled enable add 1 and enable subtract 1 applied to register 24 may be applied to the ADD/SUBT and SUBT/ADD controls of the FIG. 6 implementation. The enable insert 100 signal applied to register 24 could be used to activate the R, T and W lines for parallel loading of the 100 value into the three corresponding bits of the counter. A type SN 54191 counter of Texas Instruments Company could be used as well.

Figure 7:
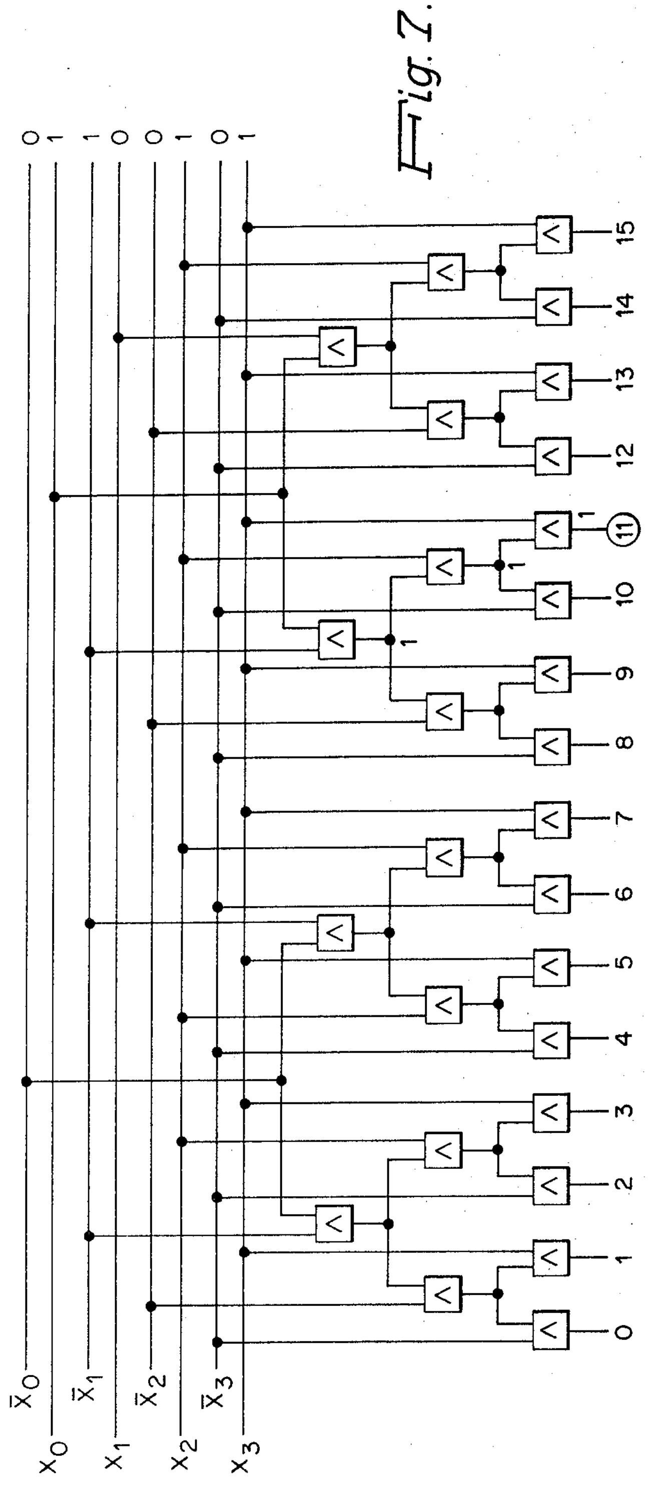
FIG. 7 is a detailed implementation of a prior art decoder of a type which may be used in the invention.

With reference to the decoder 65, this function may be readily achieved by a standard decoder as shown in FIG. 7. In that case, the parallel input is applied to the lines designated by X0-X3 and the particular code will be recognized by activation of one of the lines labelled 0–15. Similar circuitry may be employed for the detectors 72, 74 and 76.

Figure 8:
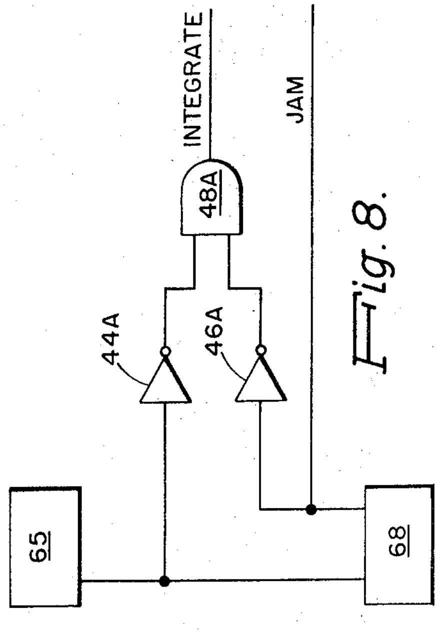
FIG. 8 is an exemplary implementation of the control logic unit of FIG. 3.

The control logic unit 54 of FIG. 3 is typically implemented by the circuitry indicated in FIG. 8. This is simply achieved with an AND gate 48A employing inverters 44A and 46A on its inputs in response to the signals from the recognizer 65 and flip-flops 68. The AND gate 48A provides the INTEGRATE signal to the digital integrator 56 and the input to inverter 46A provides the JAM signal to the digital integrator 56.

Figure 9:
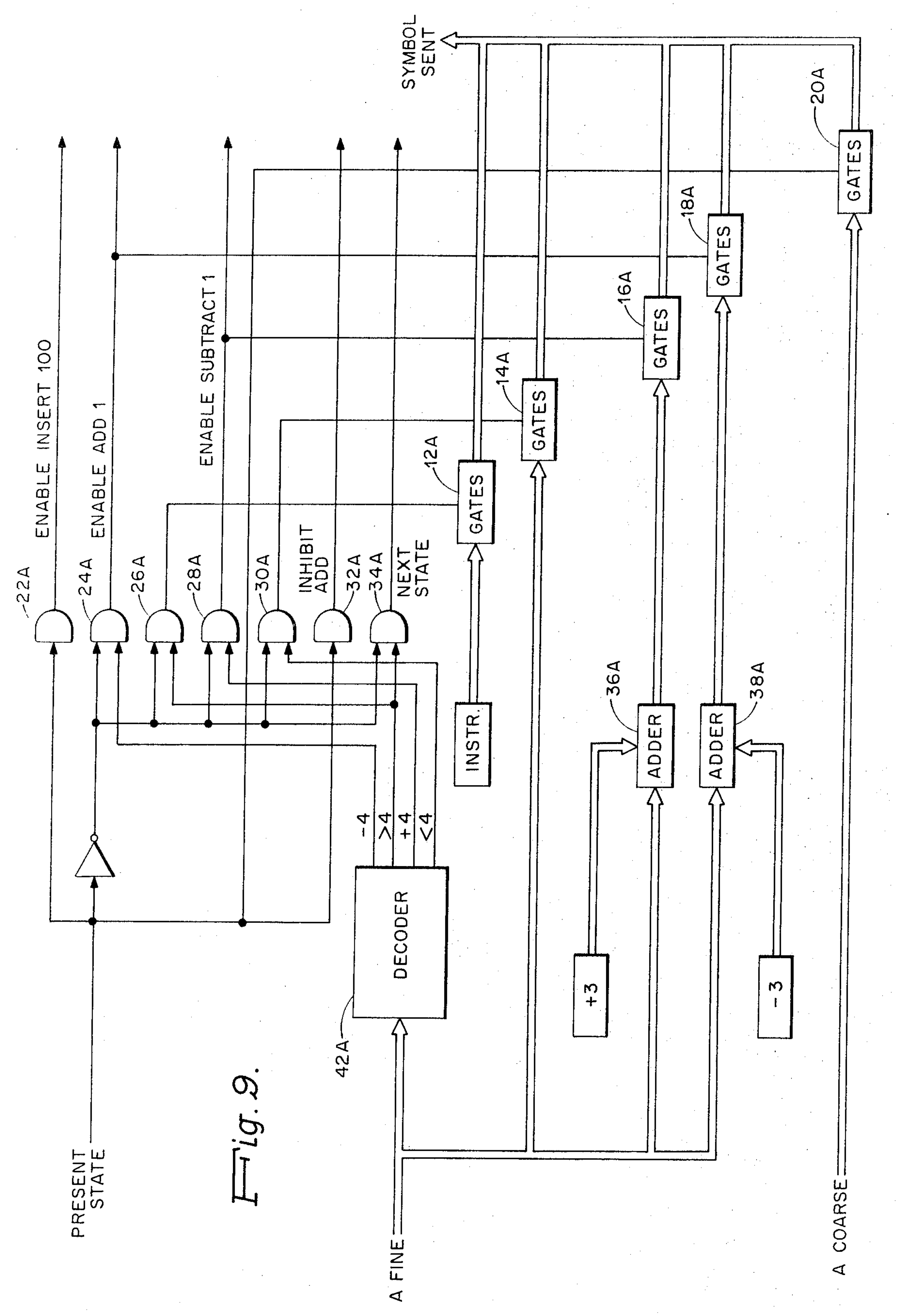
FIG. 9 is an exemplary implementation of the decision logic unit of FIG. 2.

The decision logic unit 32 is exemplified by an implementation in FIG. 9 which is labelled in its inputs and outputs to correspond to the designations of FIG. 2. In particular, the implementation labels input and output lines in accordance with the drawings. The output code is provided from each of the AND gates 12A, 14A, 16A, 18A and 20A which are controlled by a further set of AND gates 22A, 24A, 26A, 28A, 30A, 32A and 34A to pass sample digital words from arithmetic register 28, digital adders 36A and 38A (to add or subtract a constant 3) or the instruction code 40A. The gates 22A–34A are controlled by the present state signals from flip-flop 42 shown above and the respective values of A in register 28 as defined by decoder 42A. The gates 22A–34A provide the three enable inputs to current value register 24 as indicated, the reset state signal to flip-flop 42 and the inhibit add signal also as shown.

While preferred embodiments of the invention, including both the method and circuitry, have been illustrated and described, since a variety of different embodiments will be obvious to those skilled in this art, and may be preferred by different designers, the invention should not be circumscribed by the disclosed embodiments, but rather should be viewed in light of the following claims.

What is claimed is:

1. A delta modulation system for providing successive digital words to represent the information contained in successive groups of digital elements, the digital words to have generally fewer numbers of digital elements than the successive groups of digital elements, said system comprising:

means responsive to said successive groups of digital elements for determining when the difference between adjacent groups of digital elements is within a predetermined range;

means for encoding said successive groups of digital elements and operative in response to a determination that said difference is within said predetermined range to provide a digital word corresponding to said difference;

said encoding means including means operative in the absence of said determination for providing a digital word corresponding to a group of digital elements itself.

2. A delta modulation system as set forth in claim 1 including means for adding a digital flag signal to the succession of digital words preceding each digital word corresponding to a group itself.

3. A delta modulation system for providing successive digital words to represent successive groups of digital elements wherein each group represents a numerical value, said system comprising:

means responsive to said successive groups of digital elements for determining whether the values represented by adjacent ones of said groups differ numerically by more than a predetermined numerical value; and means for encoding said groups of digital elements and operative in response to a value difference determined not to be more than said predetermined value to provide a digital word corresponding to said value difference according to a first coding scheme;

said encoding means further including means operative in response to a value difference determined to be more than said predetermined value for providing a digital word approximating the absolute value of a group of digital elements according to a second coding scheme.

4. The delta modulation system of claim 3:

wherein said encoding means includes means for providing a digital indication in the succession of digital words of the coding scheme used; and further including as means for recovering a sequence of groups of digital elements from the digital words:

means for decoding said digital words and responsive to a digital indication of use of said first coding scheme to provide a group of digital elements differing in value from the preceding group in the recovered sequence by the value difference corresponding to that digital word;

said decoding means having means responding to an indication of use of said second coding scheme to provide groups of digital elements having values corresponding to the values represented by said digital words.

5. The delta modulation system of claim 3 wherein the digital words of said first and second coding schemes contain substantially fewer numbers of digital elements than in said groups of digital elements whereby digital words from said first coding scheme are capable of representing a limited range of value differences substantially smaller than the range of values representable by said groups of digital elements and further whereby the digital words of said second coding scheme are generally capable of representing an approximation to the absolute values of said groups of digital elements within a predetermined error.

6. The delta modulation system of claim 5 further including means for relfecting the error in the approximation of a digital word from said second coding scheme into subsequent digital words thereby to reduce the propagation of the error in the digital words from said second coding scheme.

7. A delta moduation system for providing a succession of code words corresponding to digital samples of an analog signal including:

means for repetitively sampling said analog signal;

means for providing a multi-bit digital word of each sample using digital words selected from a first vocabulary capable of representing a first plurality of values of said analog signal;

repeated sampling of said analog signal resulting in a sequence of digital words;

means for examining said sequence and operative to provide simultaneous examination of adjacent digital words;

means for providing an output indication when examined adjacent digital words in said sequence differ in value by more than a predetermined value;

first means operative in the absence of said output indication for generating a digital code selected from a second vocabulary to represent the difference in value between the corresponding adjacent digital words, said second vocabulary having substantially fewer digital codes than said first vocabulary; and second means responsive to said output indication for generating a digital code from a third vocabulary to approximate one of said examined adjacent digital words, said third vocabulary having words representative of a limited number of values distributed over the range of said analog signal.

8. The delta modulation system for digitally describing an analog signal of claim 7 and further including:

means operative in association with said second generating means for providing in a subsequent one of said digital codes a component reflecting the error in the approximation from said third vocabulary.

9. The delta modulation system of claim 8 further including:

means for receiving the digital codes from said first and second generating means;

means operative in response to received digital codes from said first generating means to provide words from said first vocabulary with sequentially differing digital values representative of the received digital codes from said first generating means; and means operative in response to received digital codes from said second generating means to provide corresponding digital words from said third vocabulary;

means for causing digital words provided subsequent to those in response to the digital codes from said second generating means to be provided to reduce the error reflected in digital codes from said second generating means thereby to refine the approximation and reduce the error in successive digital words.

10. A delta modulation system for providing a sequence of digital codes to describe an analog signal and including:

means for repetitively sampling said analog signal;

means for providing a multi-bit digital word for each sample with a digital word from a vocabulary of words for describing a plurality of discrete values of said analog signal, the repetitive sampling resulting in a sequence of said digital words;

means for providing coincident temporary storage of adjacent digital words in said sequence;

means for providing a digital difference output to represent the difference in value between the stored adjacent words;

means for providing an output indication whenever the digital difference output exceeds a predetermined value;

means operative in response to said output indication for selecting a digital code comprising the most significant bits of one of said stored digital words;

means further operative in response to said output indication for generating a digital code to indicate a predetermined change in value for said analog signal less than the smallest value difference representable by said most significant bits; and means operative in response to the absence of said output indication for selecting said digital difference output as the digital code for one of said stored digital words.

11. The delta modulation system of claim 10 wherein:

said digital difference output selecting means is operative to provide digital codes from a vocabulary having fewer digital codes than the number of possible multi-bit digital words for the analog signal samples; and said system further including means for encoding the digital words for said digital difference output in a first digital code from said vocabulary and a correction applied in a subsequent digital code.

12. A delta modulation system for digitally describing an analog signal including, in combination:

sampling means for taking successive analog signal samples and for converting each sample of the analog signal into a sequence of words of six digital bits representing the sample value;

differencing means for producing a digital word representing the difference in value between each current sample of the analog signal and the preceding sample;

decision means for determining if the value of the digital word representing said difference is greater than a predetermined value;

said decision means producing a first output signal if the difference is no greater than the predetermined value and a second output signal if the difference is greater than the predetermined value;

means for transmitting a digital word comprising the three lowest order bits of the digital word representing said difference in response to the first output signal; and means for transmitting a digital word comprising the three highest order bits of a sample word in response to the second output signal.

13. A delta modulation system for digitally describing an analog signal including, in combination:

sampling means for repetitively sampling the value of the analog signal;

quantizing means for converting each sample of the analog signal into a sequence of digital words each including a given number of digital bits;

differencing means for producing a digital word representing the difference in value between each current sample of the analog signal and the preceding sample;

decision means for determining if the value of the digital difference is greater than a predetermined value;

a digital word vocabulary for the digital word representing said difference having digital words of fewer bits than said given number of digital bits;

said decision means producing a first signal if the digital difference is no greater than the predetermined value and a second signal if the difference is greater than the predetermined value;

means for transmitting a digital code word from a vocabulary having code words of the same number of digital bits as said difference representing digital word to describe the difference between the current and preceding sample values in response to the first signal; and means operative in response to said second signal for transmitting a flag digital code word of said same number of bits followed by a digital code word of said number of bits corresponding to the sample value itself;

said transmitting means being operative to transmit a first specific one of the code words in said vocabulary when the current and previous sample values are the same;

said transmitting means further being operative to approximate the difference in sample value which equals said predetermined value and to modify the succeeding digital code word to cause it to represent the difference between the approximation and the next sample value.

14. A delta modulation system as set forth in claim 13 including, in combination, means for receiving said transmitted digital code words;

means for integrating the sample value difference represented by each successive received digital code word representing a value difference with previous sample value differences to produce an output representative of the successive sample values of the original analog signal;

means for resetting the integrating means to the sample value represented by each digital code word representing a sample value itself;

means for producing a flagging signal in response to each flag digital code word in the received code word sequence; and means for causing the integrating means to integrate each successive sample value difference and for causing resetting of the integrating means in response to the flag signal to the same value represented by the digital code word following the flag code word in the received succession.

15. A delta modulation system as set forth in claim 14 in which:

the digital code words which represent the difference between sample values represent substantially all of the possible sample value differences between reference sample values defined as values corresponding to code words which represent the sample itself; and the means for resetting the integrating means in response to the flag code word resets the integrating means to the reference sample value identified by the digital code word following the flag code word.

16. A method of delta modulation for providing successive digital words to represent successive groups of digital elements wherein each group represents a predetermined value, said method including the steps of:

determining whether the values represented by adjacent ones of said groups of digital elements differ by more than a predetermined range of values; and encoding groups of digital elements representing a value difference determined to be within said predetermined range according to a value difference representing code scheme;

encoding a group representing a value difference determined to be outside said predetermined range according to a code scheme representing the absolute value thereof.

* * * * *